(12) United States Patent
de Julián Aguado et al.

(10) Patent No.: US 8,940,214 B2
(45) Date of Patent: Jan. 27, 2015

(54) METHOD FOR THE MANUFACTURE OF ONE OR MORE PAIRS OF COMPONENTS IN COMPOSITE MATERIAL

(75) Inventors: Antonio de Julián Aguado, Madrid (ES); José Luis Lozano García, Madrid (ES)

(73) Assignee: Airbus Operations S.L., Madrid (ES)

( * ) Notice: Subject to any disclaimer, the term of this patent is extended or adjusted under 35 U.S.C. 154(b) by 822 days.

(21) Appl. No.: 12/206,873

(22) Filed: Sep. 9, 2008

(65) Prior Publication Data

US 2009/0321985 A1  Dec. 31, 2009

(30) Foreign Application Priority Data

Jun. 27, 2008 (ES) .................... 200801936

(51) Int. Cl.
| | |
|---|---|
| B29C 70/30 | (2006.01) |
| B29C 70/38 | (2006.01) |
| B29C 70/54 | (2006.01) |
| B29L 31/08 | (2006.01) |
| B29L 31/30 | (2006.01) |
| B64C 3/20 | (2006.01) |
| B64F 5/00 | (2006.01) |

(52) U.S. Cl.
CPC .......... *B29C 70/30* (2013.01); *B29C 70/38* (2013.01); *B29C 70/386* (2013.01); *B29C 70/545* (2013.01); *B29L 2031/082* (2013.01); *B29L 2031/3082* (2013.01); *B29L 2031/3085* (2013.01); *B64C 3/20* (2013.01); *B64F 5/0009* (2013.01); *Y02T 50/433* (2013.01); *Y02T 50/43* (2013.01)
USPC .......................... 264/258; 264/160

(58) Field of Classification Search
USPC .......................... 264/258, 160, 316
See application file for complete search history.

(56) References Cited

U.S. PATENT DOCUMENTS

| | | | | | |
|---|---|---|---|---|---|
| 2,114,470 | A | * | 4/1938 | Hutt et al. | 229/400 |
| 3,700,535 | A | * | 10/1972 | McCoy et al. | 428/367 |
| 3,996,089 | A | * | 12/1976 | More et al. | 156/235 |
| 4,292,108 | A | * | 9/1981 | Weiss et al. | 156/259 |
| 4,588,466 | A | * | 5/1986 | Eaton | 156/235 |
| 4,666,546 | A | * | 5/1987 | Treber | 156/264 |
| 6,343,639 | B1 | * | 2/2002 | Kaye et al. | 156/539 |
| 2004/0026025 | A1 | * | 2/2004 | Sana et al. | 156/256 |
| 2004/0098852 | A1 | * | 5/2004 | Nelson | 29/428 |

* cited by examiner

*Primary Examiner* — Benjamin Schiffman
(74) *Attorney, Agent, or Firm* — Ladas & Parry LLP

(57) ABSTRACT

Method of manufacture of one or more pairs of components in composite material (11, 13; 11', 13') intended to form part of aerofoils located on both sides of the axis of symmetry of an aircraft whose shape has a conical tendency in the longitudinal direction, the angle of conicity being less than 10°, that comprises the following stages: a) Lay-up of layers on a flat tape lay-up table forming the laminate of a hypothetical component formed by all of the components of said pairs (11, 13; 11', 13'), the components of each pair being arranged adjacently and the first components (11, 11') and the second components (13, 13') of each pair being arranged alternately, and the whole being arranged symmetrically relative to a hypothetical horizontal axis X-X of the tape lay-up jig; b) Cutting of the flat laminates corresponding to each of said components); c) Forming and curing said components.

9 Claims, 6 Drawing Sheets

METHOD FOR THE MANUFACTURE OF ONE OR MORE PAIRS OF COMPONENTS IN COMPOSITE MATERIAL

FIELD OF THE INVENTION

The present invention relates to the combined manufacture of one or more pairs of components in composite material and in particular of components with a C-shaped profile with conical tendency intended to form part of two aerofoils located on both sides of the symmetry axis of a particular aircraft model.

BACKGROUND OF THE INVENTION

Component manufacturing processes that basically comprise a tape lay-up stage and a hot forming and curing stage are well known in the aeronautical industry.

In the tape lay-up stage, layers of a composite material such as prepreg, which is a mixture of fibre reinforcement and storable polymeric matrix, are placed in a mould/jig of suitable shape.

This material can be in various forms and in particular in the form of layer. For thermosetting matrices the resin is generally cured partially or is brought by another process to a controlled viscosity, called the B-stage.

The layers of composite material are not placed randomly, but are arranged in each zone in a number and with an orientation of their fibre reinforcement, typically of carbon fibre, that depend on the nature and the magnitude of the stresses that are to be withstood by the component in each zone.

Thus, each zone has a particular structure of the arrangement or stacking of the layers. The difference in thickness between the different zones generates drops in the layers, which requires having a template of layers for each component that clearly establishes how they must be arranged on the mould/jig during the stacking process. The final result is a flat laminate with zones of different thickness.

In the second stage, firstly a hot forming process is carried out, which consists basically of positioning the flat laminate resulting from the first stage on a jig or mandrel with a suitable geometry and applying heat and vacuum according to a defined cycle, so that said laminate adapts to the shape of the jig. Secondly, a final curing process is carried out in an autoclave with temperature and vacuum, until the component reaches its finished state, in the absence of a final processing operation.

Using processes of this type, in the aeronautical industry various C-shaped components of composite material have been fabricated, such as spars and ribs of torsion box-beams of horizontal stabilizers of aeroplanes using automatic tape lay-up machines in the tape lay-up stage.

In these processes, the tape lay-up stage is carried out either for a single component or for several identical components. In the first case, generally the capacity of the tape lay-up jig is not fully utilized, and in the second case, if more components are made than are required for one aeroplane, a very expensive stock of components is generated, owing to the costs of the material and the volume of the components.

The present invention aims to avoid these drawbacks.

SUMMARY OF THE INVENTION

One aim of the present invention is to provide a method of manufacture of components of composite material with conical tendency relating to aerofoils of aircraft that makes it possible to optimize the tape lay-up area of the automatic tape lay-up (ATL) machines.

Another aim of the present invention is to provide a method of manufacture of components of composite material with conical tendency relating to aerofoils of aircraft that makes it possible to optimize the material necessary for the tape lay-up of the components.

Another aim of the present invention is to provide a method of manufacture of components of composite material with conical tendency that permits the simultaneous production of one or more pairs of components relating to aerofoils located on either side of the fuselage of an aircraft.

These and other aims are achieved by a method for the manufacture of one or more pairs of components in composite material intended to form part of two aerofoils located on both sides of the axis of symmetry of a specified aircraft model and whose shape has a conical tendency in the longitudinal direction, that comprises the following stages:

Lay-up of layers of composite material arranged with different orientations of their reinforcing fibres on a flat tape lay-up table forming the laminate of a hypothetical component formed by all of the components of said pairs, the components of each pair being arranged adjacently and the first components corresponding to one of said aerofoils and the second components corresponding to the other aerofoil being arranged alternately, and the whole being arranged symmetrically relative to a hypothetical horizontal axis X-X of the tape lay-up jig.

Cutting of the flat laminates corresponding to each of the components of said pairs.

Forming and curing of the components of said pairs.

In a preferred embodiment of the present invention, the lay-up of complete layers of any orientation is carried out using a single orientation dial with the 0°-180° direction coinciding with the aforementioned horizontal axis X-X. This provides significant optimization of the tape lay-up stage.

In another preferred embodiment of the present invention, the lay-up of local layers is carried out, allocating each component individually using orientation dials with their 0°-180° directions coinciding with the axes delimited by the adjacent edges of the components of each pair. This provides optimization of the lay-up of these layers.

In another preferred embodiment of the present invention, the lay-up of the incomplete layers at 90° is carried out using orientation dials with their 0°-180° directions coinciding with the axes delimited by the adjacent edges of the components of each pair. This makes it possible to optimize the lay-up of these layers without the slopes formed having an adverse effect on the subsequent installation of components such as rib angles or stiffeners.

In another preferred embodiment of the present invention, the lay-up of the local layers at 0° that are allocated to the longitudinal edges of said components is carried out using orientation dials with their 0°-180° directions coinciding with the axes delimited by the edges of the components of said pairs.

Other characteristics and advantages of the present invention will become clear from the following detailed description of an application illustrating its aims, referring to the accompanying drawings.

DETAILED DESCRIPTION OF THE INVENTION

In a preferred embodiment, the present invention relates to the manufacture of pairs of spars and ribs in composite for aerofoils located on both sides of the fuselage of an aircraft, that is, pairs of symmetrical components with C-shaped profile and conical tendency by a method of "hot forming" in which there is folding of the flanges of the spars and ribs and the wings of the C-shaped profile of a flat laminate previously laid up by means of an ATL machine and that ends with a process of autoclave curing.

Figure 1:
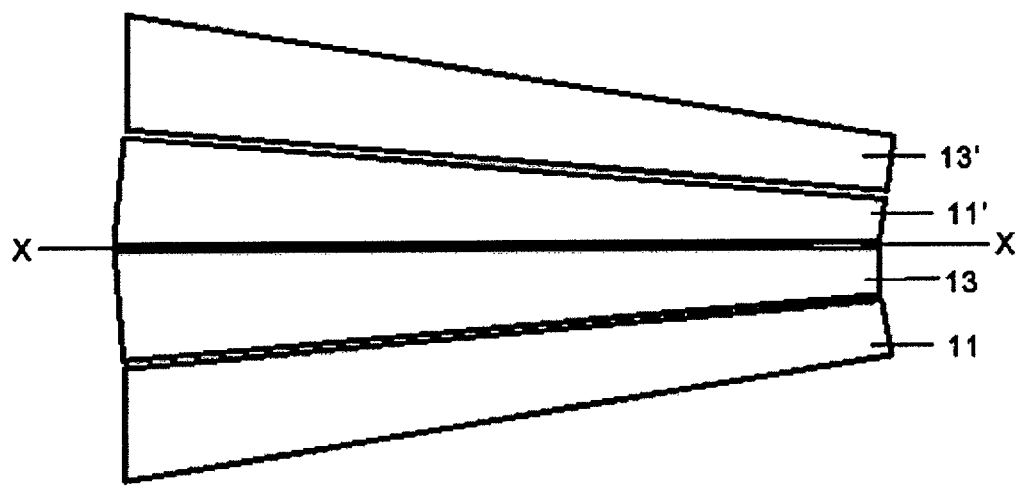
FIG. 1 is a schematic view of the four components that are laminated simultaneously according to a preferred embodiment of the present invention.

In the preferred embodiment of the invention illustrated in the drawings and that will now be described, reference is made to the combined manufacture of two pairs of components 11, 13; 11', 13' (although, as a person skilled in the art will readily appreciate, the method is applicable to the combined manufacture of a larger number of pairs), the objective of the tape lay-up stage being to obtain a flat laminate in which said components can be cut, for subsequent forming to a C-shaped profile. FIG. 1 shows the result that is to be obtained after the cutting operation: two pairs of components separated by the horizontal axis X-X of the tape lay-up jig, with alternate arrangement of the first components 11, 11' corresponding to one of said aerofoils and the second components 13, 13' corresponding to the other aerofoil.

For the purposes of the present invention the term "conical tendency" is to be understood as characterizing components to which the present invention relates in the broad sense, including components with a linear or curved directrix whose cross-section decreases with increasing distance from the fuselage and on which, consequently, the longitudinal edges, straight or with some curvature, of the initial flat laminate form a defined angle to one another. Since the combined lay-up of the component assumes a "distortion" of the orientations of the different layers of the laminate relative to those envisaged in the calculation, the present invention is applicable when this "distortion" does not compromise the mechanical properties of the component. In this sense, it is understood that the angle between the longitudinal edges of the components must be less than 10° and, preferably, less than 4°.

Figure 2:
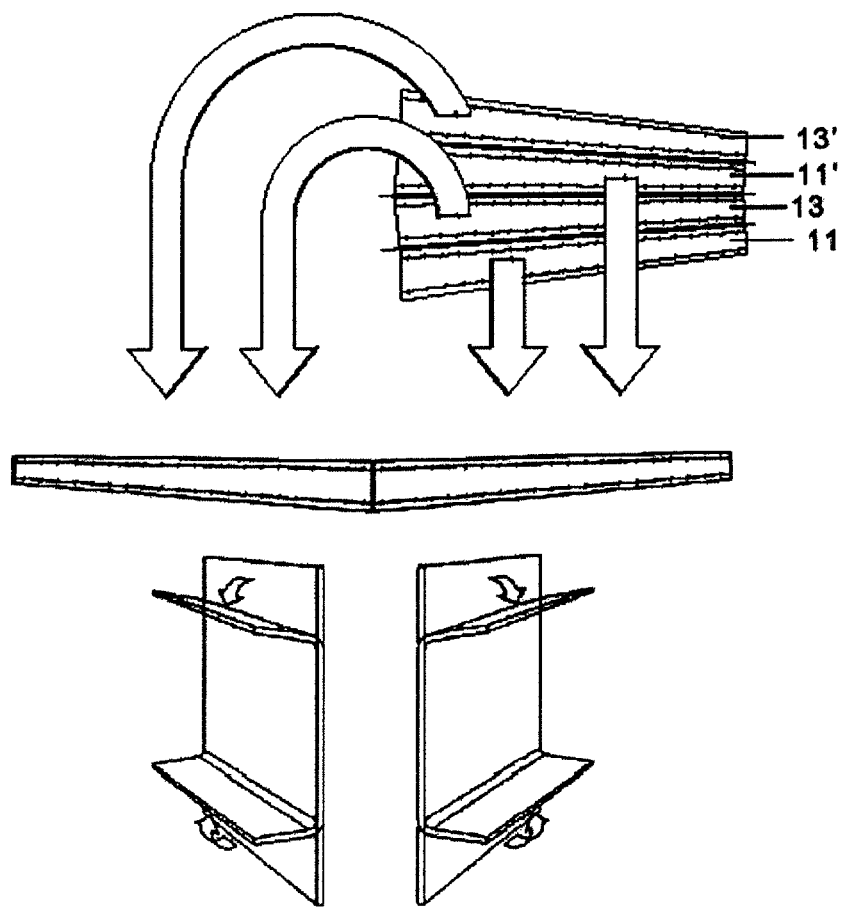
FIG. 2 is a schematic view of the stages of cutting and forming of the four components produced according to a preferred embodiment of the present invention.

Moreover, after the forming and curing of the components, it will be necessary to ensure, as shown in FIG. 2, that the position that must be occupied in the aeroplane by the second components 13, 13' is the result of a 180° rotation in the plane, relative to the tape lay-up.

As is well known, the laminating of a component in composite material is carried out by stacking layers of composite material with the fibre reinforcement oriented in various directions relative to certain defined axes following a model resulting from a process of structural calculation for guaranteeing the strength of the component. For this purpose, the ATL machine uses an orientation dial for positioning the tapes of prepreg with the orientation established in said model.

Since in the present case it is a question of combined lamination of four components, the criteria to be followed for maintaining the symmetry by layers are stated below.

Complete Layers

Figure 3:
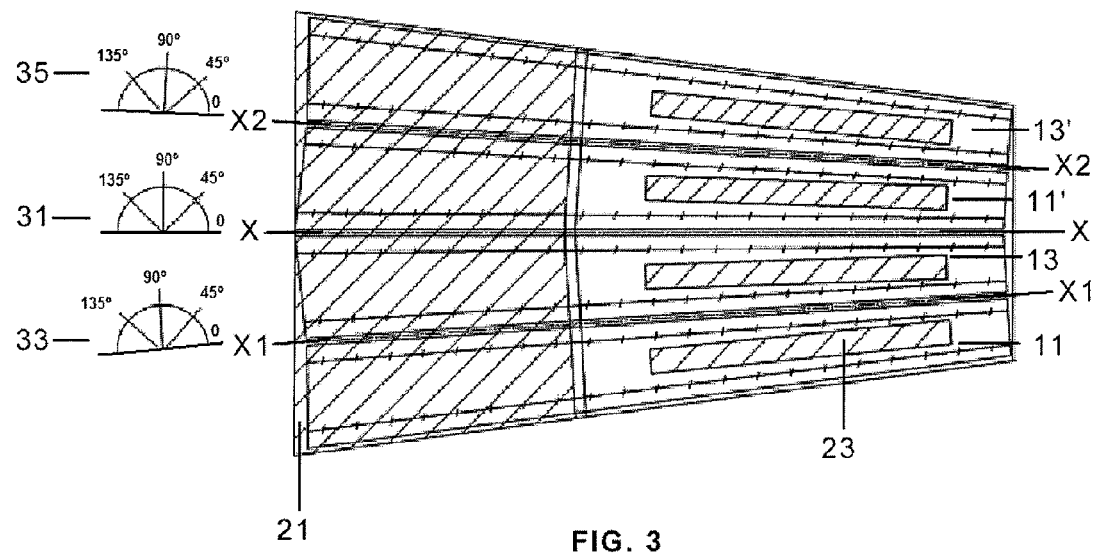
FIG. 3 is a schematic view of the laminating of complete layers and local layers that are allocated individually to each component according to a preferred embodiment of the present invention.

The layers that relate to the combined lamination of the four components 11, 13, 11', 13' as 45° layer 21 in FIG. 3 (shown relating only to the left-hand part of the laminate) are laid-up using the general orientation dial 31 referenced to the axis of symmetry X-X of the whole laminate (and of the tape lay-up jig).

It implies that, in each of these components 11, 13, 11', 13', the orientation of each layer is not exactly the same orientation relative to its axis of symmetry that it would have if laminated individually, but the corresponding deviation is taken into account by the calculation model.

Moreover, since it can be assumed that for each 45° layer there is a 135° layer in contact with it, the 180° displacement of components 13 and 13' has the effect that a 45° layer is converted to a 135° layer and a 135° layer is converted to a 45° layer, so that apparent initial phase difference in the laminate is not relevant.

Incomplete Layers

Figure 4:
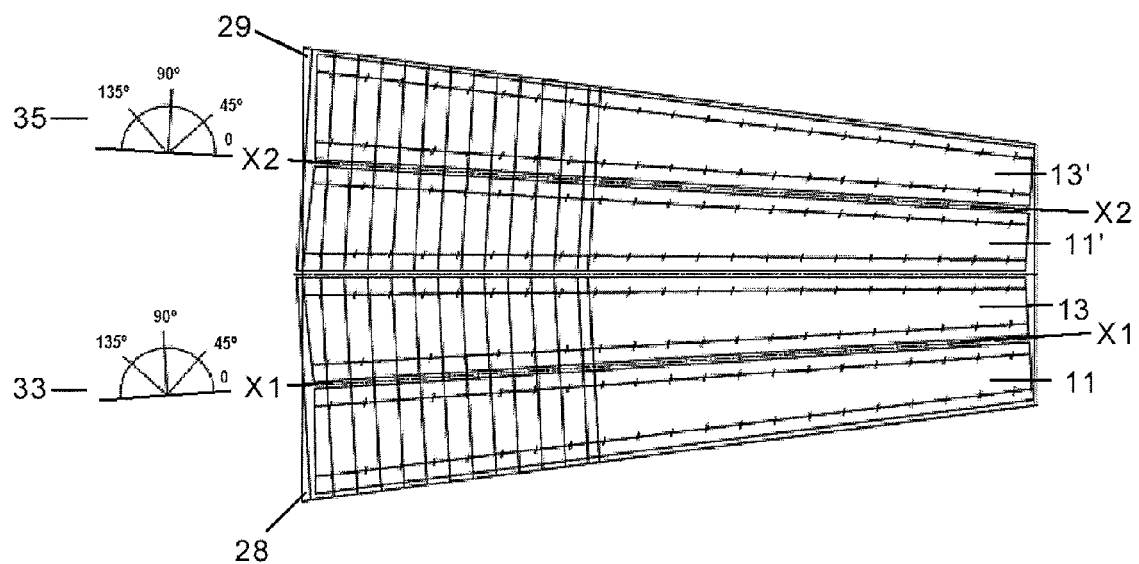
FIG. 4 is a schematic view of the laminating of incomplete layers at 90° according to a preferred embodiment of the present invention and FIG. 5 is an enlarged view showing the slopes generated by said incomplete layers.
Figure 5:
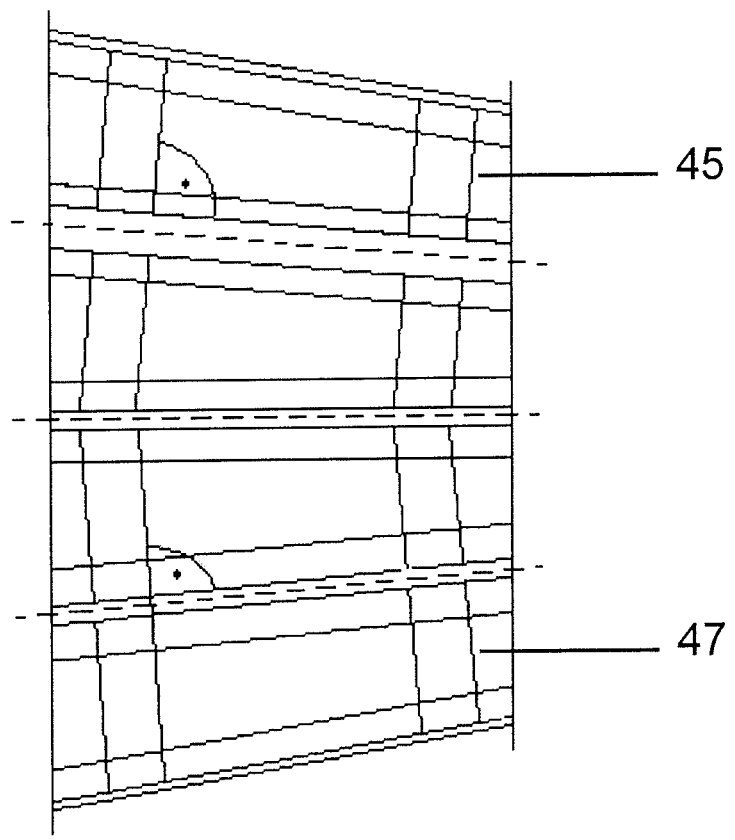

In the components to which the present invention is applicable, most of the 90° layers do not apply to the whole laminate since they disappear in the longitudinal direction, generating slopes that must be taken into account because they affect other elements. In layers of this type, such as layers 28 and 29 in FIG. 4, tape lay-up is carried out with the orientation dials 33, 35 of each one of the pairs, with 0°-180° directions coinciding with the axes delimited by the adjacent edges of the components of each pair 11, 13; 11', 13'. Consequently the slopes generated by the termination of each layer as slopes 45 and 47 in FIG. 5 are perpendicular to said axes of symmetry and not to the bisectrices of components 11, 13, 11', 13'. This deviation is small, and does not have a significant geometric effect for the installation of elements such as angles or stiffeners on the components.

Individual Local Layers

The local layers that are allocated individually to components 11, 13, 11', 13' as the 450 layers 23 in FIG. 3 are laid-up with the orientation dials 33, 35 with their 0°-180° directions coinciding with the axes delimited by the adjacent edges of the components of each pair.

Local Layers on the Longitudinal Edges

Figure 6:
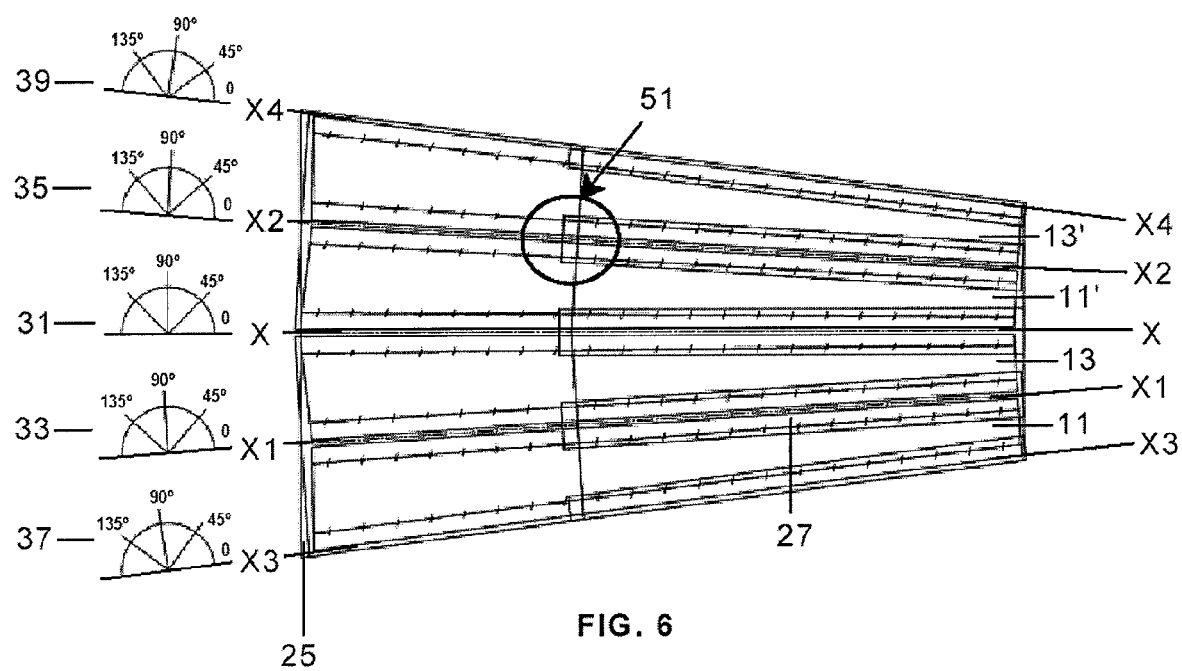
FIG. 6 is a schematic view of the laminating of local layers at 0° on the longitudinal edges of the components.

The local layers of reinforcements on the longitudinal edges of components 11, 13, 11', 13' as the 0° layers 27 in FIG. 6 are laid-up using orientation dials 31, 33, 35, 37, 39 with their 0°-180° directions coinciding with axes X-X, X1-X1, X2-X2, X3-X3, X4-X4 delimited by the edges of the components of said pairs 11, 13; 11', 13'.

Figure 7:
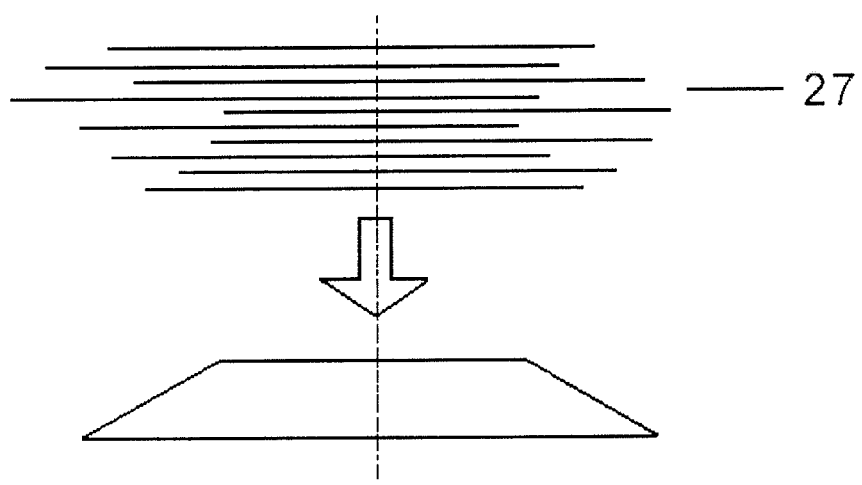
FIG. 7 is a schematic view of the laminating of these local layers at 0° alternately displacing tapes of a predetermined width.

It is customary to lay up said local layers with complete widths of tape or with half widths (between 75 and 300 mm) to avoid wastage of material. To ensure that this does not compromise achievement of the required symmetry, the layers of reinforcement of predetermined constant width are displaced in the manner depicted in FIG. 7 (top). Consolidation of the reinforcement means that finally it is formed as shown in FIG. 7 (bottom).

Figure 8:
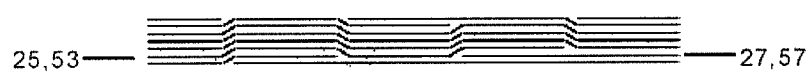
FIG. 8 is a schematic view of zones of overlap of layers at 0° with different cross-section and FIG. 9 is a schematic view of the patterns that are laid-up with local dials in these layers.
Figure 9:
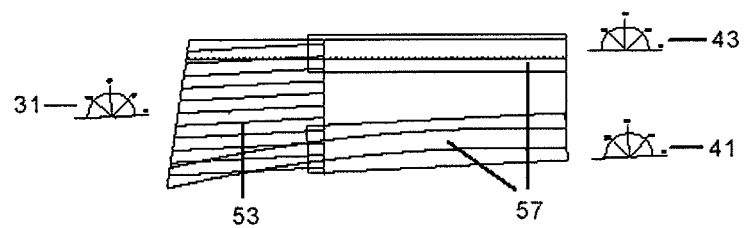

Moreover, usually local reinforcements of this type are not uniform in the transverse direction and, as shown in the circled zone 51 in FIG. 6 and in FIGS. 8 and 9, starting from one point the layers only progress through the zone of cords/flaps in strips 57 (FIG. 9) or 27 (FIG. 6). In these cases, as shown in greater detail in FIGS. 8 and 9, overlaps are used between complete patterns and partial patterns to avoid generating zones with undesirable over-thicknesses. As can be seen in particular in FIG. 9, the strips 57 are laid-up with the local dials 41, 43 and utilized for regenerating the orientations that would be distorted if the general dial 31 were followed.

Modifications that are included within the scope defined by the following claims can be introduced in the preferred embodiment that we have just described.

The invention claimed is:

1. Method of manufacture of one or more pairs of aerofoil components for use in an aircraft having an axis of symmetry said components being made of a composite material designed to form part of two aerofiols to be located on each side of the axis of symmetry of a specified aircraft model and whose shape has a decreasing cross section in the longitudinal direction, the angle between the longitudinal edges of said components, in a planar projection, being less than 10°, which method comprises the following stages:
    a) Lay-up of layers of composite material arranged with different orientations of their reinforcing fibres on a flat tape lay-up table forming a laminate lay-out comprising all of the components of said pairs, the components of each pair being arranged adjacently so as to minimize the amount of material between adjacent pairs and the first components corresponding to one of said aerofoils and the second components corresponding to the other aerofoil being arranged alternately, and the whole being arranged symmetrically relative to a horizontal axis of the tape lay-up jig;
    b) Cutting of the flat laminates corresponding to each of the components of said pairs;
    c) Forming and curing of the components of said pairs.

2. Method according to claim 1, wherein for the lay-up of layers of any orientation that are allocated to the whole of the laminate, a single orientation dial with the 0°-180° direction coinciding with the aforementioned horizontal axis X-X is used in stage a).

3. Method according to claim 1, wherein, there are lay-up of layers at 90° that do not cover the whole of the laminate in the longitudinal direction, for which orientation dials are used, with their 0°-180° directions coinciding with the axes (X1-X1, X2-X2) delimited by the adjacent edges of the components of each pair.

4. Method according to claim 1, wherein there are lay-up of local layers of any orientation allocated individually to each of said components, for which orientation dials with their 0°-180° directions coinciding with the axes (X1-X1, X2-X2) delimited by the adjacent edges of the components of each pair are used in stage a).

5. Method according to claim 1, wherein, there are lay-up of local layers at 0° that are allocated to the longitudinal edges of said components, for which orientation dials with their 0°-180° directions coinciding with the axes (X-X, X1-X1, X2-X2, X3-X3, X4-X4) delimited by the edges of the components of said pairs, are used in stage a).

6. Method according to claim 5, wherein said tape lay-up is carried out using a predetermined tape width and alternately displacing each successive layer on either side of said axes at a predetermined distance.

7. Method according to claim 5, wherein said local layers are not uniform in the transverse direction and complete layers are overlapped with partial layers, employing local dials in the required directions for the lay-up of these partial layers.

8. Method according to claim 1, wherein in stage c), said components are formed with a C-shaped cross-section.

9. Method according to claim 1, wherein the angle between the longitudinal edges of said components is less than 4°.

* * * * *